C. MARTIN.
HEATER.
APPLICATION FILED DEC. 14, 1920.
1,413,539.
Patented Apr. 18, 1922.
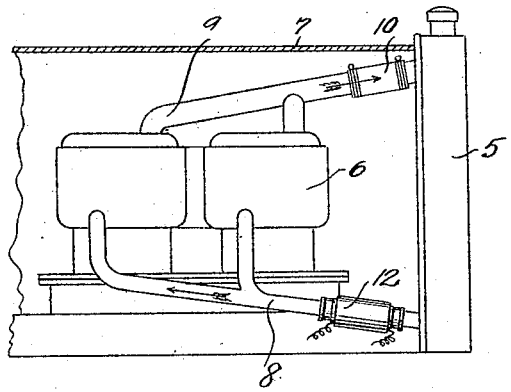
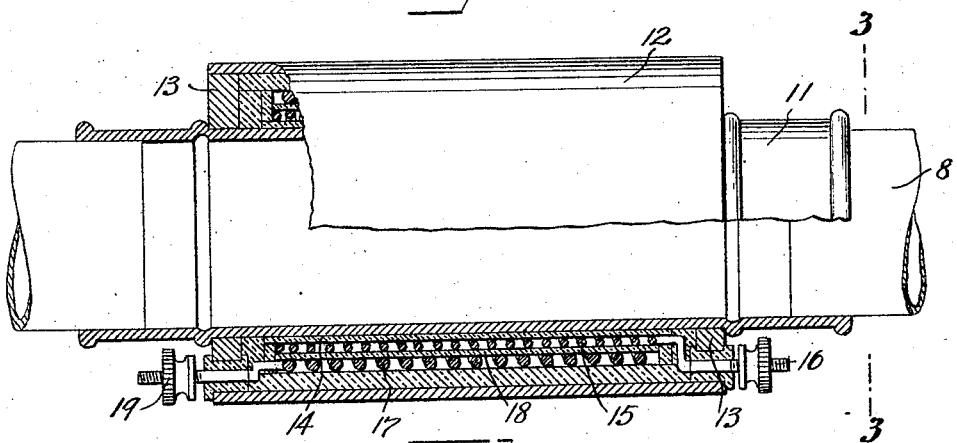
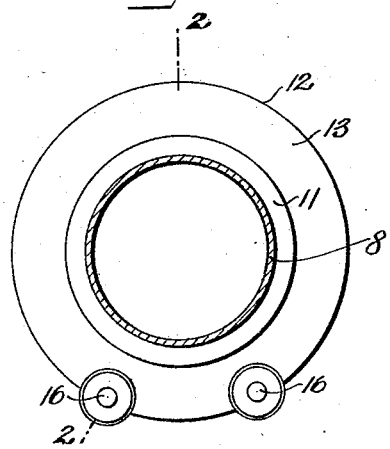
WITNESSES
INVENTOR
CONSTANT MARTIN
BY
ATTORNEYS

UNITED STATES PATENT OFFICE.

CONSTANT MARTIN, OF EAST ORANGE, NEW JERSEY.

HEATER.

1,413,539.　　　　Specification of Letters Patent.　　Patented Apr. 18, 1922.

Application filed December 14, 1920. Serial No. 430,737.

*To all whom it may concern:*

Be it known that I, CONSTANT MARTIN, a citizen of the United States, and resident of East Orange, in the county of Essex and State of New Jersey, have invented a new and Improved Heater, of which the following is a full, clear, and exact description.

In connection with automotive vehicles, it is a well appreciated fact that considerable difficulty has been experienced, incident to the fact that the cooling system in cold weather is subject to the liability of freezing, which would obviously result in a great amount of damage to the parts of the power plant.

With this in view, numerous expedients have been adapted, such as heating the garage normally occupied by the vehicle. This obviously involved the expenditure of a considerable amount of money, incident to the installation of the necessary heating equipment, and the maintenance thereof.

Also, difficulty has been experienced in this connection due to the fact that constant attention was necessary to the heating plant operation, to guard against the dying out of the fire utilized for the operation of the same.

Aside from this defect, and others, expedients have proven insufficient for the reason that the heat generated by the same has not been at a point sufficiently near to the cooling system of the vehicle to adequately heat the fluid within the same, so that despite the expense involved and particularly in severe weather, the water within the cooling system has frozen.

Having this in mind, I have now constructed a heater which shall not alone serve to heat the fluid within the cooling system of an automotive vehicle, but shall in fact, act as a unit of the cooling system, and which shall be equally adaptable for use in connection with extraneous sources of actuating medium, as well as an actuating medium produced by a unit forming a part of the conventional present day automotive vehicle.

A further object of my invention is the provision of a heater which shall be extremely simple in construction and capable of association with the parts with which it is to co-operate, with the expenditure of a minimum amount of time.

A still further object of my invention is the provision of a device of the character specified, which will not necessitate any appreciable effort in operation, and which shall not involve the expenditure of any amount of time in the maintenance of its operation.

And still another object of my invention is the provision of a heater, which although primarily intended for use as a cooling system for an automotive vehicle may be utilized to advantage in numerous adaptations without in the least departing from the scope of my invention.

Reference is had to the attached sheet of drawings as illustrating one practical embodiment of my invention, and in which—

Figure 1 is a sectional side view taken through the hood of an automotive vehicle, and illustrating the engine and cooling system thereof, having my improved type of heater associated therewith.

Figure 2 is a fragmentary partly sectional side view of a heater constructed in accordance with my invention and taken along the lines 2—2 of Figure 3, and Figure 3 is a sectional end view taken along the lines 3—3 of Figure 2.

In these views the reference numeral 5 indicates the cooling element, or radiator, of an internal combustion engine 6, which latter is enclosed in the usual manner by a hood 7, and connected by means of the intake and discharge manifolds 8 and 9 respectively, to the radiator 5 in the usual manner.

A piece of flexible tubing 10 commonly employed for connecting both of the manifolds 8 and 9 to the radiator is removed from the lower or intake manifold, and in lieu thereof my improved heater is substituted. This heater preferably includes a tube 11 of a high heat conductor, which tube serves to couple the intake manifold with the radiator as aforestated.

A second tube or sleeve 12 is arranged concentrically with respect to the tube 11, and is spaced therefrom, as has been clearly indicated in Figure 2 by any suitable means such as washers 13.

A sleeve of insulating material 14 encircles the tube 11, and a layer of resistance wire, providing a coil 15 is arranged upon the insulating sleeve 14, and suitable terminals 16 serve to provide a medium whereby this coil may be connected with some suitable source of current supply, such as a storage battery of the vehicle.

From the foregoing it will be appreciated that I have constructed a heater which shall at all times be in position, and shall occupy no more space than that already occupied by the element in lieu of which it is substituted.

Also, upon current being permitted to flow through the convolutions of the coil, it will be seen that the fluid within the tube 11 will be warmed, and for the reason that this tube is arranged virtually at the lowest point in the cooling system, it will be obvious that the coldest water within the same, i. e. that portion of the body of water most liable to freeze will be the first to be effected. Also the water so heated will flow upwardly in accordance with the well known law of physics upon this point, and in passing through the jackets of the engine 6 as well as the radiator 5, will serve to raise the temperature of the water within these portions, aside from the water which displaces the heated water, and is in turn warmed by means specified.

It will be obvious that my heater would present quite a drain upon the storage battery, if the heater were permitted to operate for any great length of time, such as from 24 to 48 hours, as would be the case where the vehicle was in a garage, and with a view of permitting of the operation of the heater without subjecting the battery of the vehicle to this strain. I may conveniently utilize a second resistance coil 17, which may be arranged around the first named coil 15, and suitably insulated therefrom by a secondary sleeve of insulating material 18.

Also any suitable terminals 19 may be connected to the end portions of the wire forming the coil 17 so that the conventional current supply, forming a part of the garage lighting system may be employed to advantage to operate the heater.

By this provision, my heater may be utilized for example with a 6 volt or 110 volt circuit, and it will be obvious that any suitable number of additional coils might be associated therewith for rendering the same adaptable to various sources of current.

Obviously numerous modifications of structure might readily be resorted to without in the least departing from the spirit of my invention, which I claim as—

1. As an article of manufacture, a heater adapted to be interposed between the radiator and fluid manifold of an internal combustion engine, said heater including a tube, a sleeve concentrically disposed with respect to said tube, washers interposed between said sleeve and tube and adjacent the ends of the same, and a resistance element interposed between said sleeve and tube and disposed in coils between the same.

2. As an article of manufacture, a heater adapted to be interposed between the radiator and fluid manifold of an internal combustion engine, said heater including a tube, a sleeve concentrically disposed with respect to said tube, washers interposed between said sleeve and tube and adjacent the ends of the same, a plurality of resistant coils arranged between said sleeve and tube and an insulating sleeve interposed between each of said resistant coils, said coils being adapted to be actuated by currents of different voltages.

CONSTANT MARTIN.